Sept. 26, 1933.     B. DICK     1,928,095
BRAKING MECHANISM
Filed Aug. 1, 1928

Inventor
Burns Dick
By E. E. Huffman
Att'y.

Patented Sept. 26, 1933

1,928,095

UNITED STATES PATENT OFFICE 1,928,095

BRAKING MECHANISM

Burns Dick, St. Louis, Mo., assignor to Wagner Electric Corporation, St. Louis, Mo., a corporation of Delaware Application August 1, 1928. Serial No. 296,655

8 Claims. (Cl. 188—78)

My invention relates to brake mechanism of the internal expanding and external contracting types such as used on automobile vehicles, for example, and its object is to improve the operation of such mechanism with respect both to noise and efficiency.

In a two-shoe brake the majority of the wear on the brake lining will occur while the brakes are operating at what may be termed a normal running temperature which may, for the purpose of this description, be considered to be approximately 100 degrees F. Therefore the radius of curvature of the brake lining will soon become, if it was not initially so provided, equal to the radius of curvature of the brake drum when said drum is at said normal running temperature. But the brake drum is subject to the other conditions of having a much lower temperature when the vehicle is not in use and the atmospheric temperature is low and having a much higher temperature during a heavy or prolonged application of the brakes. Each of these conditions causes the radius of curvature of the braking surface of the drum to vary from the radius of curvature of the surface of the brake lining and the brakes lose efficiency under these conditions and also, particularly when the brake drum is cold, have a tendency to "grab" and to squeak. It is the object of my invention to provide means whereby the surface of the brake shoe will more nearly conform to the surface of the drum throughout the range of drum temperature than has heretofore been the case.

Figure 1:
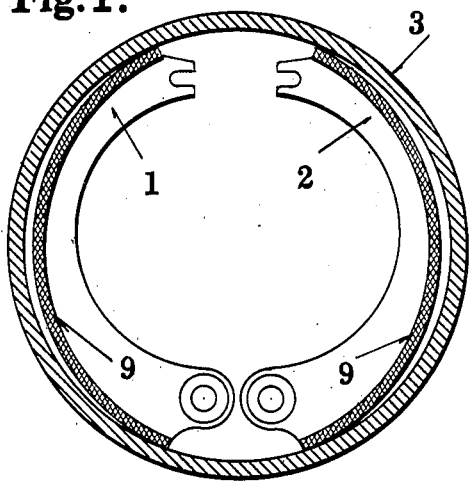
Figure 2:
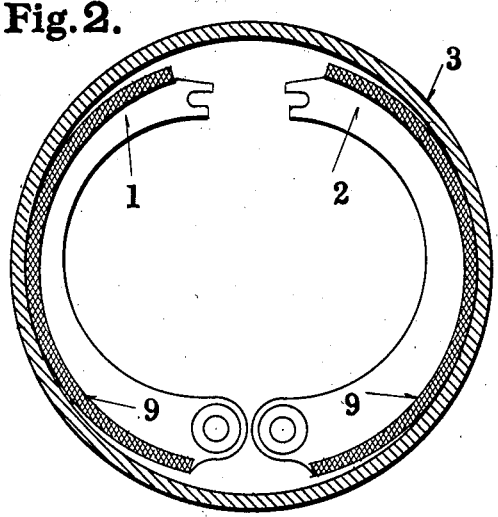
Figure 3:
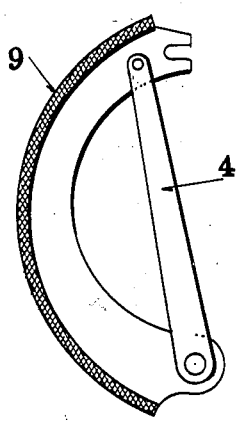
Figure 5:
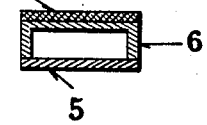
Figure 4:
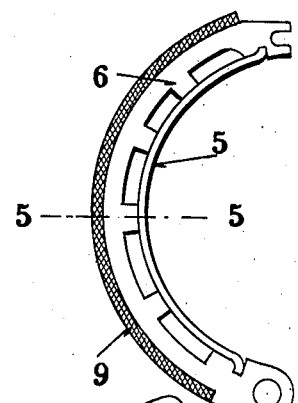
Figure 7:
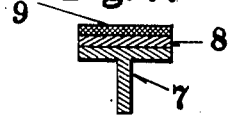
Figure 6:
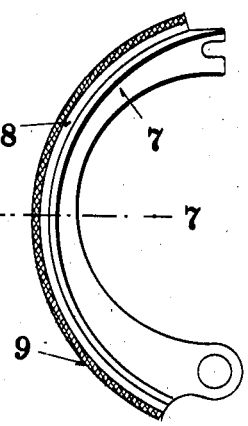
Figure 8:
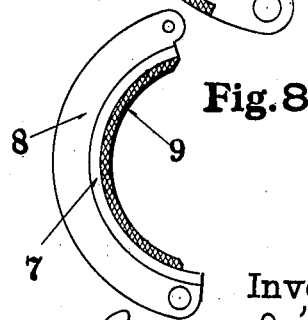

Referring to the accompanying drawing, Figures 1 and 2 illustrate, to somewhat an exaggerated extent as necessary in a small drawing, the conditions hereinabove referred to which it is the object of my invention to correct; Figures 3, 4 and 6 illustrate brake shoes of different specific form but all embodying the principle of my invention; Figure 5 is a cross section of the shoe shown in Figure 4; Figure 7 is a cross section of the shoe shown in Figure 6; and Figure 8 illustrates my invention applied to a brake shoe of external type.

1 and 2 represent the brake shoes and 3 the brake drum, the brake lining on the shoes being shown in Figure 1 as contacting with the drum only at their ends. This is the condition which exists when the brake drum is cold—that is, below the temperature existing during the normal operation of the brakes. Figure 2 illustrates the condition existing when the brake drum is above normal temperature resulting from prolonged or very heavy application of the brakes, under which condition only the intermediate portion of the lining contacts with the drum. It will be understood that the radius of curvature of the brake lining is assumed to be the same as the radius of curvature of the drum when the drum is at the normal operating temperature, by "normal" temperature being meant the temperature in effect the greater part of the time during the ordinary operaton of a vehicle with the somewhat frequent, but usually light applications of the brakes employed in operating a vehicle over the average roads and under average traffic conditions.

It will be apparent that if the radius of curvature of the braking surface of the brake shoes can be caused to change under change of temperature conditions which cause the radius of curvature of the brake drum to change, the brake shoes will be more efficient throughout the entire range of operating conditions and less likely to produce squeaks. In accordance with my invention I achieve this result by providing temperature controlled means for changing the conformation of the braking surface of the shoe by increasing or decreasing its curvature. The means illustrated for this purpose in Figure 3 comprises the bar 4 attached at its ends to the end of the arcuate shoe, this bar being preferably of metal having a higher expansion coefficient than the metal of the brake shoe. With this arrangement increase of temperature of the brake drum, lining and shoe will be communicated to the expansion member 4, which member, upon expansion, will tend to flatten the braking surface of the shoe, or in other words, increase its curvature radius, and since the effect of heat on the drum is to also increase curvature radius, the device described will maintain the curvature radii of the drum and shoe surface more nearly equal than if the expansion bar were not provided. In the device illustrated in Figures 4 and 5 the expansion member is curved and secured to the channel section of metal of which the brake shoe is formed. It will be apparent that in this construction the higher expansion coefficient of the metal member 5 will cause modification in the radius of curvature of the channel shoe member 6.

In Figure 6 I have illustrated a brake shoe comprising an inner arcuate member 7 which may be of aluminum, for example, and an outer band 8 firmly secured thereto at a plurality of points throughout its length, such as by riveting, said member 8 being of steel or other material having a lower coefficient of expansion than the inner member 7. In all figures 9 indicates brake lining which, for the purpose of the present description and claims, is considered a part of the "brake shoe." In applying my invention to an external type shoe, as shown in Figure 8, the metal part 7 having the higher coefficient expansion is of course nearest the drum.

Having fully described my invention, what I claim as new and desire to secure by Letters Patent of the United States is:

1. A brake shoe having a beam of aluminum and a flange of steel.

2. A non-flexible brake shoe comprising an outer curved metal part and an inner metal part having a continuous curved surface in engagement with the inner surface of the outer part and extending over a substantial portion of the length of the outer part, said inner part being secured at its ends to the outer part and having a sufficiently greater coefficient of expansion than the outer part that when the outer part is subjected to an increase in temperature the resulting increase in temperature of the inner part will cause the outer part to be distorted as a whole to increase the radius of curvature of its outer surface.

3. A brake shoe comprising an outer curved metal part and a rigid inner curved metal part secured to the ends of the outer part and in continuous contact with the inner surface of the outer part intermediate its ends, the inner part having a sufficiently greater coefficient of expansion than the outer part to cause the outer part to be distorted as a whole to increase the radius of curvature of its outer surface.

4. The combination of a brake drum, a brake shoe adapted to cooperate with the periphery of the drum, the braking surface of said shoe having a radius of curvature equal to the radius of curvature of the braking surface of the drum when the temperature of the drum and shoe is the same and of a selected value intermediate the high and low limits of temperature resulting from atmospheric and operating conditions, and rigid metallic means connecting the ends of the brake shoe and forming therewith a thermostatic couple adapted to distort the brake shoe to maintain the curvature radius of its braking surface approximately the same as the curvature radius of the braking surface of the drum under changes of temperature of the drum and shoe resulting from braking action.

5. A non-flexible brake shoe comprising a metallic member provided with a curved braking surface, and a second rigid metallic member having a substantially greater coefficient of expansion than the first member and secured to the ends thereof whereby when the shoe is subjected to an increase in temperature the expansion of the second member will so distort the first member that the curvature of the braking surface will be increased.

6. A non-flexible brake shoe comprising an outer curved metal part and a rigid inner metal part having a substantially greater coefficient of expansion than the outer part, said inner part having a continuous surface adjacent the outer part and being secured to the ends thereof whereby when the shoe is subjected to an increase in temperature the total excess of expansion of the inner part will be applied to the ends of the outer part to thereby distort the outer part as a whole and increase its curvature.

7. A brake shoe comprising an outer curved steel member and a rigid inner aluminum member secured to the ends of the outer member.

8. A brake shoe comprising an outer curved steel member and a rigid inner aluminum member secured to the outer member and in continuous contact with the inner surface of the outer member.

BURNS DICK.